(12) United States Patent
Tyler

(10) Patent No.: US 10,173,575 B2
(45) Date of Patent: Jan. 8, 2019

(54) MODULAR BUMPER ATTACHMENT

(71) Applicant: Dustin Tyler, Des Moines, IA (US)

(72) Inventor: Dustin Tyler, Des Moines, IA (US)

( * ) Notice: Subject to any disclaimer, the term of this patent is extended or adjusted under 35 U.S.C. 154(b) by 20 days.

(21) Appl. No.: 15/415,396

(22) Filed: Jan. 25, 2017

(65) Prior Publication Data

US 2018/0208099 A1 Jul. 26, 2018

(51) Int. Cl.
  *B60P 3/39* (2006.01)
  *B60R 19/48* (2006.01)
  *A45F 3/24* (2006.01)

(52) U.S. Cl.
  CPC .................... *B60P 3/39* (2013.01); *A45F 3/24* (2013.01); *B60R 19/48* (2013.01)

(58) Field of Classification Search
  CPC .............. B60P 3/39; B60R 19/48; A45F 3/24; A47C 7/66
  See application file for complete search history.

(56) References Cited

U.S. PATENT DOCUMENTS

| 3,342,441 | A | * | 9/1967 | Danielson | ............... B60R 19/02 224/509 |
| 4,318,501 | A | | 3/1982 | Graber | |
| 5,911,399 | A | | 6/1999 | Mannion | |
| 6,070,926 | A | * | 6/2000 | Hardin | ...................... B60P 3/40 224/518 |
| 6,467,110 | B1 | | 10/2002 | Ketcher | |
| 6,474,522 | B1 | | 11/2002 | Johnson | |
| 7,073,857 | B1 | | 7/2006 | Bailey | |
| 8,584,276 | B1 | | 11/2013 | Wilson | |
| 9,066,576 | B1 | | 6/2015 | Stassinos et al. | |
| 9,072,368 | B2 | | 7/2015 | Mueller | |
| 9,179,759 | B1 | * | 11/2015 | Turner | ...................... A45F 3/22 |
| 2008/0006666 | A1 | | 1/2008 | Kerr | |
| 2016/0058197 | A1 | | 3/2016 | Jungling | |

FOREIGN PATENT DOCUMENTS

CA 2811655 10/2014

* cited by examiner

*Primary Examiner* — D Glenn Dayoan
*Assistant Examiner* — Melissa A Black
(74) *Attorney, Agent, or Firm* — McKee, Voorhees & Sease, PLC

(57) ABSTRACT

A modular bumper attachment system configured to be attached or mounted to the bumper of a vehicle or base member. The modular bumper attachment system may include a first attachment member and a second attachment member, each attachment member having a receiving member and an aperture defined by an outer wall that is configured to encompass the bumper of a vehicle. The system may also include one or more support members that are removably attached to the receiving member of each attachment member. The support member may have a first end and a second end, wherein the first end is removably attached to the receiving member. The second end of each support member may extend in a generally outward direction from the base member and include one or more connectors configured to removably attach a hammock, tent, awning, storage container, cooler, etc. to the support member.

16 Claims, 4 Drawing Sheets

MODULAR BUMPER ATTACHMENT

FIELD OF THE INVENTION

The invention relates generally to a modular bumper attachment system. More specifically, but not exclusively, the invention relates to a modular hammock attachment system that may be removably attached to a base or a bumper of a vehicle.

BACKGROUND OF THE INVENTION

Traveling and camping are very popular activities. When camping, individuals usually need to pack a large number of items within a confined space such as a back pack or car trunk. With limited space for packing, the ability to reduce the size and number of things that need to be packed is highly desirable. When camping or taking long trips, individuals require a place to sleep or relax.

Hammocks are popular items for sleeping and relaxing in. A conventional hammock or sling typically includes a net or fabric-like material that may be suspended from two or more points and is configured for a person to lie or sit in. For example, a hammock may be suspended between two trees or a metal frame may be constructed to hang the hammock from. The hammock itself does not require a lot of space for storage or transport, making it an ideal item for traveling. Depending on the location, there may not be enough trees or the trees may be too far apart to hang a hammock. In this situation, a hammock with a frame is required, which may be large and bulky. When traveling in a personal vehicle, for example, a car, truck or recreational vehicle (R.V.), an individual may utilize a hammock or bed that may be attached to a vehicle. Examples of prior vehicular mounted hammock frames include those described in U.S. Pat. No. 9,179,759 B1 (hereinafter, "patent '759"), U.S. Publ. No. 2008/0006666 (hereinafter, "publication '666") or U.S. Publ. No. 2016/0058197 (hereinafter, "publication '197"), all of which are herein incorporated by reference in their entirety. However, in prior vehicle mounted hammock frames, the hammock frame is either attached via the hitch or towing receiver. There are also examples of hammocks that may be attached to a vehicle via the support rails on the top of the vehicle or in/on top of a truck bed. These systems however are not modular and often utilize space that can be otherwise useful for storage or towing.

Therefore, there remains a need in the art for a portable hammock and/or hammock frame configured to be attached to a personal vehicle when the vehicle does not have a towing receiver or mounting rails.

BRIEF SUMMARY OF THE INVENTION

Therefore, it is a primary object, feature, and/or advantage of the invention to improve on and/or overcome the deficiencies in the art.

It is another object, feature, and/or advantage of the invention to provide a modular bumper attachment system including at least two attachment members that include one or more receiving members and an outer wall defining an aperture that is configured to encompass a bumper and/or a base member.

It is yet another object, feature, and/or advantage of the invention to provide a modular bumper attachment system including a support member comprising a first end and a second end, wherein the first end of the support member is removably attached and/or connected to the receiving member of each attachment member.

It is a further object, feature, and/or advantage of the invention to provide a modular bumper attachment system including one or more connectors operatively attached to the second end of the support member. The connectors may be configured to removably attach or connect a hammock, tent, awning, storage container, cooler, etc.

It is still a further object, feature, and/or advantage of the invention to provide a modular bumper attachment system including at least two attachment members that include one or more receiving members and an outer wall defining an aperture that is configured to encompass a bumper and/or a base member, wherein the at least two attachment members are spaced along the base member. In an example embodiment, two attachment members may be removably attached to opposing ends of the base member.

It is still yet a further object, feature, and/or advantage of the invention to provide a bumper attachment member comprising an aperture defined by an outer wall, wherein the outer wall is configured to encompass the bumper of a vehicle. The bumper attachment member further comprises a receiving member attached to the outer wall, and a securing member that is operatively attached to the outer wall of the bumper attachment member. The securing member may be configured to removably secure the bumper attachment member to the bumper of the vehicle.

It is still yet a further object, feature, and/or advantage of the invention to provide a bumper hammock system comprising a first attachment member and a second attachment member, each attachment member having a receiving member and an aperture defined by an outer wall that is configured to encompass the bumper of a vehicle. The bumper hammock system further comprises one or more support members that are removably attached to the receiving member of each attachment member. The support member comprises a first end and a second end, wherein the first end is removably attached to the receiving member. The second end of each support member extends outward from the base member and includes a connector configured to removably attach a hammock, tent, awning, storage container, cooler, etc. to the support member.

It is still yet a further object, feature, and/or advantage of the invention to provide a bumper hammock system comprising one or more attachment members and one or more support members, wherein the support members include multiple connectors that allow for connection of one or more items, such as, a hammock, chair, tent, awning, storage container, cooler, clothesline, etc., between the support members.

It is still yet a further object, feature, and/or advantage of the invention to provide a bumper hammock system wherein the receiving member further comprises a clamping member that is configured to removably secure the support member to the receiving member.

It is still yet a further object, feature, and/or advantage of the invention to provide a bumper hammock system wherein the attachment member further comprises a securing member that is configured to removably secure the attachment member to the base member.

These and/or other objects, features, and advantages of the invention will be apparent to those skilled in the art. The invention is not to be limited to or by these objects, features and advantages. No single embodiment need provide each and every object, feature, or advantage.

Figure 1:
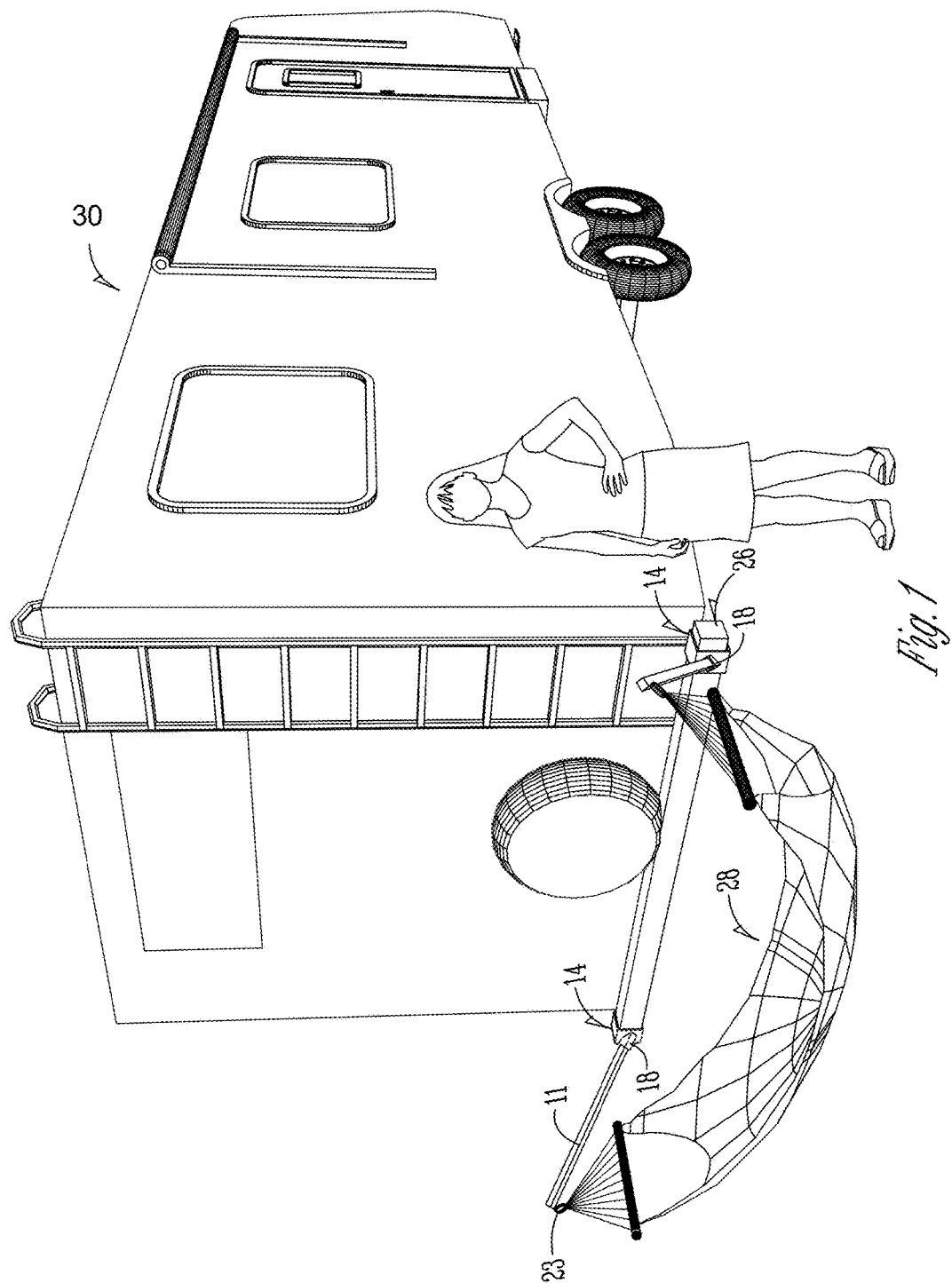
FIG. 1 is a perspective view of an example embodiment of a modular bumper attachment system attached to a vehicle.

Appendix A includes pictures of an example embodiment of a modular bumper attachment system.

Various embodiments of the invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION

The invention is directed towards a modular bumper attachment system 10. Referring to FIG. 1, an example embodiment of a modular bumper attachment system 10 is shown. The bumper attachment system 10 may be removably attached to the bumper 26 of a personal vehicle 30, such as a car, truck, trailer, motorhome or recreational vehicle (R.V.). The bumper attachment system 10 is designed to be easily removable and collapsible to allow the bumper attachment system 10 to be easily stored and/or transported. While not shown, it is also contemplated that the bumper attachment system 10 may be removably attached to a base member 26. For example, the base member or frame may include a large pipe or board positioned in a generally horizontal position, similar to the bumper 26 shown in FIG. 1.

As shown in FIG. 1, the modular bumper attachment system 10 may be attached to the bumper 26 of an R.V. 30 by one or more attachment members 14. The attachment member 14 may include an outer wall 17 that defines an aperture 20. The outer wall 17 may define an aperture 20 in the general shape of a square, rectangle, circle, oval, or similar polygonal shape. The aperture 20 may be configured to encompass the bumper 26 or base member for mounting or attaching the modular bumper attachment system 10. For example, the outer wall 17 of the attachment member 14 may be slid over the bumper 26, such that the outer wall encompasses the bumper 26. In an example embodiment, the bumper attachment system 10 may include two attachment members 14 that are removably connected or secured at opposing ends of the bumper 26. While not shown, it is contemplated that more than two attachment members 14 may be connected to the bumper 26. For example, three attachment members 14 may be connected to the bumper 26 wherein two of the attachment members 14 are spaced proximate to opposing ends of the bumper 26, and the third attachment member may be connected to a bumper 26 at any point in between the other two attachment members 14. In an embodiment including more than two attachment members, multiple hammocks, chairs, tents, awnings, storage containers, coolers, clotheslines, grills, bike rack, etc. 28 or a combination thereof may be mounted from the modular bumper attachment system 10.

Referring to FIGS. 4-7, perspective views of the attachment members are shown. As described above, the attachment member 14 includes an outer wall 17 that defines an aperture 20. The aperture 20 may be configured to encompass the bumper 26 or a base frame. Extending from the outer wall 17 is a receiving member 18. The receiving member 18 defines an aperture 22 or opening configured to receive a support member 11. The opening 22 in the receiving member may be circular, oval, square, rectangular, or a similar polygonal shape. For example, the opening 22 may be square shaped and configured to matingly receive the support member 11. The support member 11 may be configured to fit within the receiving member 18 opening 22, or the support member 11 may be configured to fit over and/or encompass the receiving member 18. The angle of the receiving member 18 relative to the attachment member 14 may be designed or adjusted to meet the needs of the user. The receiving member 18 may also include an aperture 16 or drain opening proximate to the outer wall 17 of the attachment member 14. The drain 16 should be configured to be proximate to the lowest point of the receiving member 18 when the attachment member 14 is attached or mounted on the bumper 26. The drain is designed to allow any fluid or debris that becomes trapped within the receiving member 18 to exit the receiving area.

Figure 4:
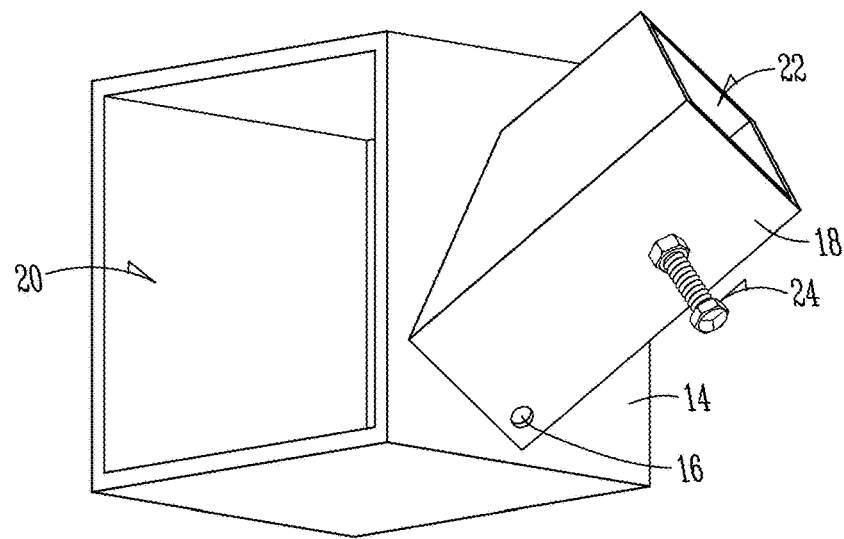
FIG. 4 is a perspective view of an example embodiment of an attachment member.
Figure 5:
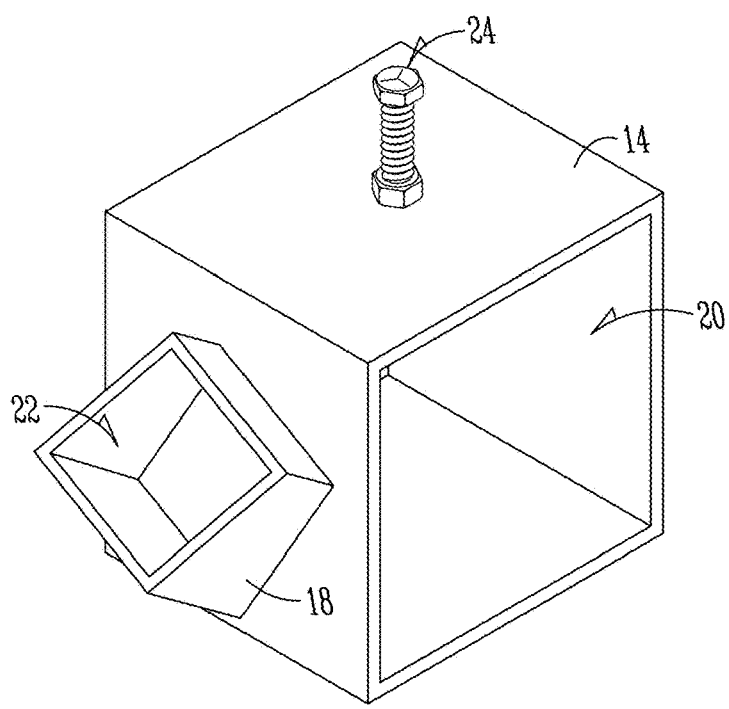
FIG. 5 is an alternative perspective view of an example embodiment of an attachment member.
Figure 6:
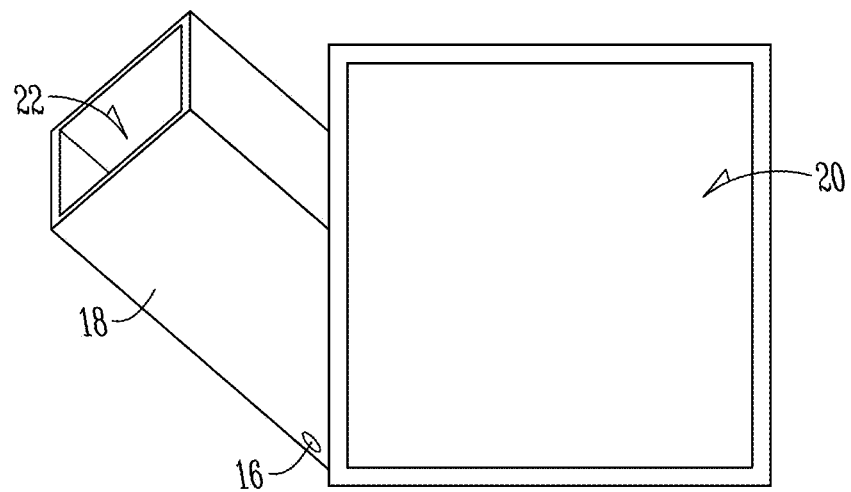
FIG. 6 is a side view of an example embodiment of an attachment member.
Figure 7:
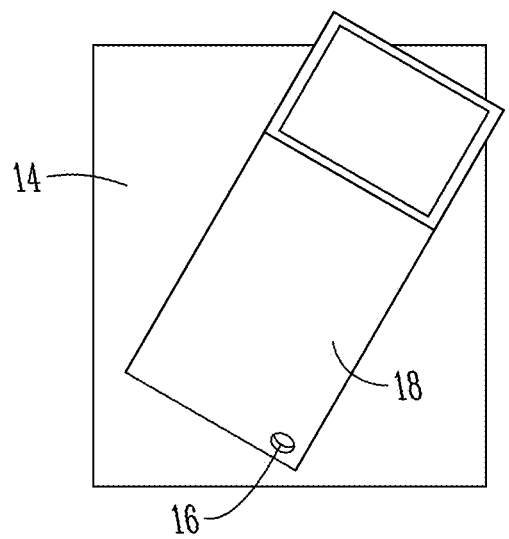
FIG. 7 is an alternative side view of an example embodiment of an attachment member.

The receiving member 18 and/or the attachment member may include a clamp 24 configured to secure the attachment member 14 to the bumper 26 and/or the receiving member 18 to the support member 11, as shown in FIGS. 4-5. For example, the clamp 24 may include a nut welded to the outer wall 17 of the attachment member 14 and a bolt configured to create a friction fit between the attachment member 14 and the bumper 26 when the bolt is tightened. Similarly, the receiving member may include a nut welded to the receiving member 18 and a bolt configured to create a friction fit with the support member 11 when the bolt is tightened. The clamping member 24 may include other similar types of clamps, vises, or fastening tools. For example, the bumper 26 and the attachment member 14 may be configured to both include matching through-holes at the point of attachment to allow the attachment member 14 to be fastened to the bumper 26 by a nut and bolt, pin, or similar fastener that passes through the attachment member 14 and the bumper 26. A similar means of fastening may be utilized to connect the support member 11 to the receiving member 18. While not shown in the figures, multiple clamping devices 24 may be utilized to fasten the attachment member 14 to the bumper 26 and/or the support member 11 to the receiving member 18.

It is also contemplated that the attachment member 14 may also be permanently fastened to the bumper 26 via a weld, epoxy, or similar fastener. Similarly, the support member 11 may also be permanently fastened to the receiving member 18. It is also contemplated that a combination of fastening techniques may also be utilized. For example, the attachment member 14 may be permanently fastened to the bumper 26, and the support member 11 may be removably fastened to the receiving member via pin or clamp 24. This would allow the support member(s) 11 to be removed and stored in a different location so as not to be permanently extending out from the back of the truck or motorhome 30. Alternatively, the attachment member 14 may be removably attached to the bumper 26 and the support member 11 may be permanently fastened to the receiving member to allow the attachment member 14 and the support member 11 to be removed and stored as a single unit.

Figure 2:
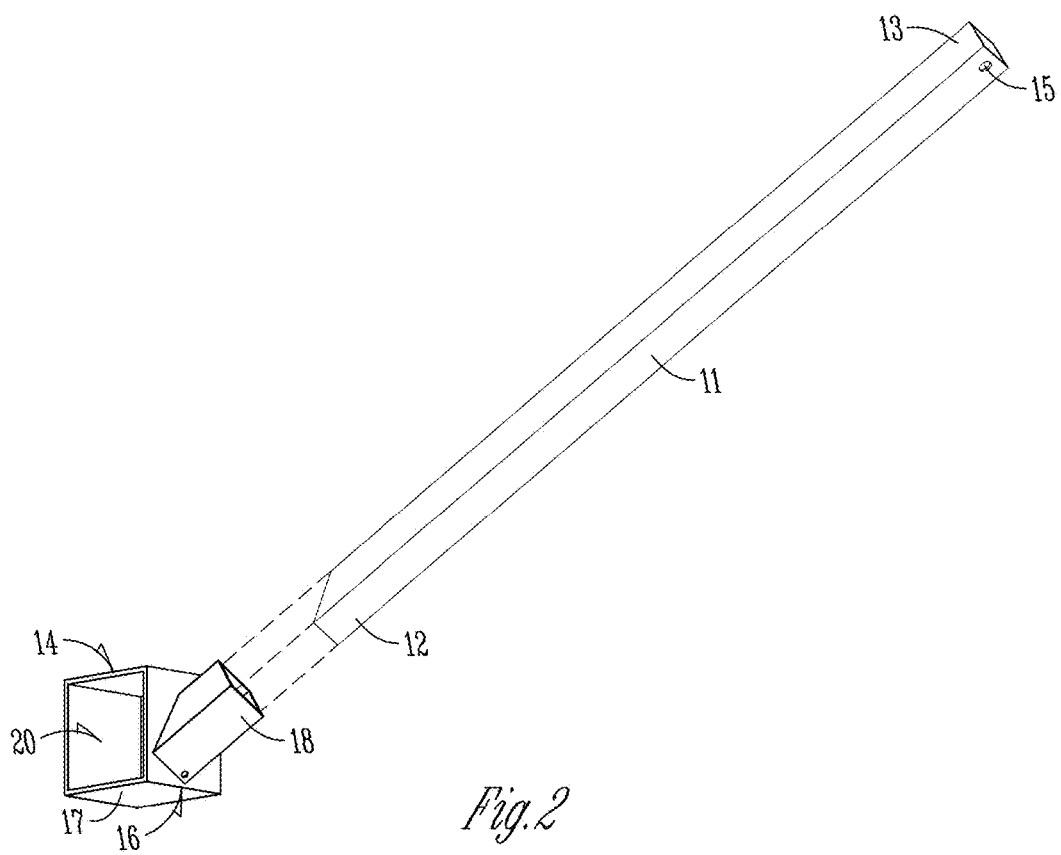
FIG. 2 is a perspective view of an example embodiment of an attachment member and support bar.
Figure 3:
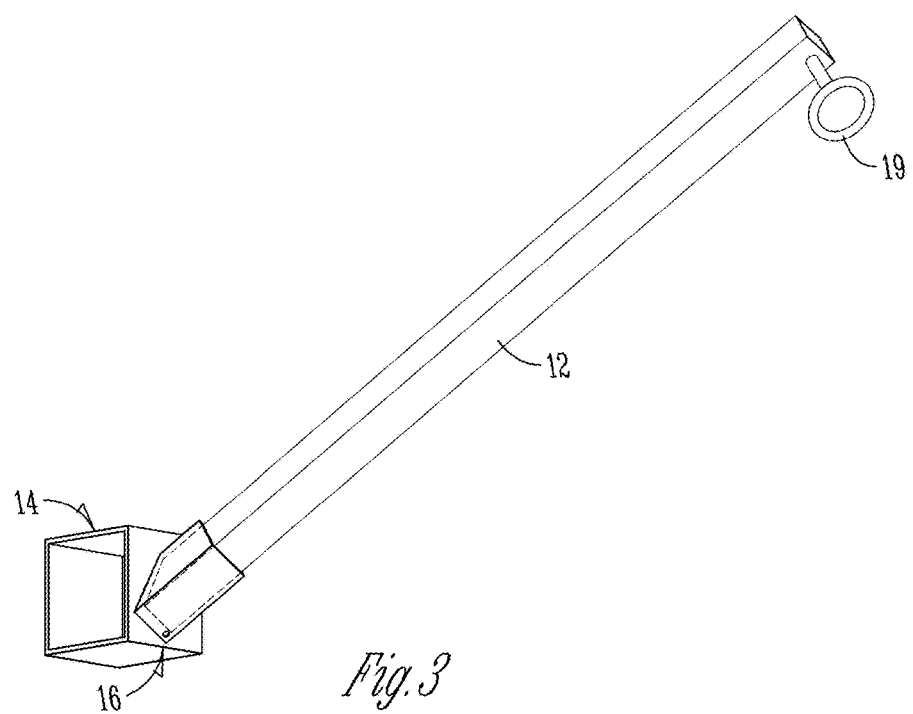
FIG. 3 is a perspective view of an example embodiment of an attachment member and support bar.

Referring to FIGS. 2-3, perspective views of the attachment member 14 and support member 11 are shown. FIG. 2 shows the support member 11 and the attachment member 14 as separate pieces. The support member has a first end 12 and a second end. The first end 12 is configured to be removably attached and/or connected to the receiving member 18 of the attachment member 14. As discussed above, the first end 12 of the support member may be attached to the receiving member 18 via clamps, vises, or similar type of fastening device. The first end 12 of the support member 11 and the receiving member 18 may also include a matching set of through-holes to allow the two pieces to be attached via a pin, nut and bolt, or similar fastening device. The second end 13 of the support member 11 may include an aperture 15, hook, or fastening point configured to secure a hammock, chair, tent, awning, storage container, cooler, clothesline, grill, bike rack, etc. 28 or some combination thereof to the modular bumper attachment system 10. Multiple apertures 15 may be included for attachment of multiple hammocks 28 or other items. A bolt with a hook or eyelet, or similar type of connector 19 may also be attached to the support member 11 for connecting one or more items 28 to the support member 11.

The length and dimensions of the support member 11 may be designed or configured based on the application. For example, if a single hammock 28 will be attached to the support member 11 proximate to the second end 13, then the support member may be cut to a length of approximately three feet long. Alternatively, if multiple items 28 will be attached to the support member 11, the support member 11 may be cut to a length of approximately six feet. In this embodiment, a first aperture 15 and/or first set of opposing connectors 19 may be attached proximate to the midpoint of the support member 11. A hammock 28 may then be attached to the first set of connectors 19. A second aperture and/or second set of connectors 19 may then be attached proximate to the second end 13 of the support member 11. A tent or awning may be attached or mounted from the second set of connectors 19 to provide shade for an individual lying in the hammock below. As discussed above, the angle of the receiving member 18 relative to the attachment member 14 may be configured based on the function. For example, if attaching a hammock 28 and a tent between opposing support members 11, then a more vertically oriented support member 11 may be desirable. However, if attaching a first hammock and a second hammock between opposing support members 11, then the support members 11 may be more angled in a generally horizontal orientation.

FIG. 3 shows the support member and attachment member 14 interconnected. As discussed above, the first end 12 of the support member may be attached to the receiving member 18 via clamps, vises, or similar type of fastening device. The first end 12 of the support member 11 and the receiving member 18 may also include a matching set of through-holes to allow the two pieces to be attached via a pin, nut and bolt, or similar fastening device. The second end 13 of the support member 11 may include an aperture 15, hook, or fastening point configured to secure a hammock, chair, tent, awning, storage container, cooler, clothesline, grill, bike rack, etc. 28 or some combination thereof to the modular bumper attachment system 10.

A modular bumper attachment system including one or more attachment members and support members configured to mount a hammock or other apparatus to the bumper of a personal vehicle has thus been described. The present invention contemplates numerous variations, options and alternatives, and is not to be limited to the specific embodiments described herein. Other changes are considered to be part of the present invention.

What is claimed is:

1. A modular bumper attachment system comprising:
   attachment members positioned at opposing ends of a base member, said base member comprising a bumper of a recreational vehicle (R.V.);
   an outer wall encompassing the base member and defining an aperture therethrough; and
   support members operably attached to the attachment members comprising a first end and a second end, said second end of the support members comprising a connector and extending outward from the base member.

2. The modular bumper attachment system of claim 1, further comprising a hammock removably attached to the connector of the support members.

3. The modular bumper attachment system of claim 1, wherein the attachment members include receiving members having an aperture to drain any fluids or debris caught within the receiving members.

4. The modular bumper attachment system of claim 3, wherein the receiving members further comprise a clamping member removably securing the support members to the receiving members.

5. The modular bumper attachment system of claim 1, wherein the attachment members further comprise a securing member removably securing the attachment member to the base member.

6. The modular bumper attachment system of claim 3, wherein the receiving members further comprise a first pair of apertures on opposing sides of the receiving members and the first end of the support members further comprise a second pair of apertures on opposing sides of the support member, said first pair of apertures aligning with the second pair of apertures and receiving a pin to removably secure the support members to the receiving members.

7. The modular bumper attachment system of claim 1, wherein the outer wall defines a square shaped aperture.

8. The modular bumper attachment system of claim 7, wherein the squared shaped aperture is positioned about the base member to define the direction the second end of the support member extends outward from the base member.

9. A bumper attachment member comprising:
   an aperture defined by an outer wall, said outer wall encompassing a bumper of a vehicle;
   a receiving member attached to the outer wall having an aperture to drain any fluids or debris caught within the receiving member; and
   a securing member operatively attached to the outer wall and removably securing the bumper attachment member to an end of the bumper of the vehicle.

10. The bumper attachment member of claim 9, further comprising a support member attached to the receiving member of the bumper attachment member and extending outward from the bumper attachment member.

11. The bumper attachment member of claim 10, wherein the support member includes a first end and a second end, said first end being removably secured to the receiving member.

12. The bumper attachment member of claim 9, wherein the receiving member further comprises a clamping member removably securing the support member to the receiving member.

13. A bumper hammock system comprising:
- a first attachment member and a second attachment member each encompassing a bumper of a vehicle and comprising a receiving member having an aperture to drain any fluids or debris caught within the receiving member;
- a support member operatively attached to each of the first and second attachment members;
- wherein the support member comprises a first end and a second end, said second end of the support member extending outward from the bumper and comprising a connector;
- wherein the first attachment member and the second attachment member are removably attached at opposing ends of the bumper; and
- a hammock removably attached to the connector of the first attachment member and the connector of the second attachment member.

14. The bumper hammock system of claim 13, wherein the first and second attachment members further comprise a securing member removably securing the attachment member to the bumper.

15. The bumper hammock system of claim 13, wherein the support member is removably secured to the receiving member by a pin extending through the receiving member and the first end of the support member.

16. The bumper hammock system of claim 13, further comprising a tent or an awning extending over and above the hammock.

* * * * *